United States Patent
Hwang et al.

(10) Patent No.: US 8,060,115 B2
(45) Date of Patent: Nov. 15, 2011

(54) APPARATUS AND METHOD FOR LOCATION ESTIMATION IN A WIRELESS COMMUNICATION SYSTEM

(75) Inventors: Suk-Seung Hwang, Yongin-si (KR); Joo-Hyun Lee, Suwon-si (KR); Sang-Boh Yun, Seongnam-si (KR); Young-Hoon Kwon, Seongnam-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 494 days.

(21) Appl. No.: 12/199,492

(22) Filed: Aug. 27, 2008

(65) Prior Publication Data
US 2009/0061899 A1 Mar. 5, 2009

(30) Foreign Application Priority Data
Sep. 3, 2007 (KR) .......................... 10-2007-0088986

(51) Int. Cl.
*H04W 88/02* (2009.01)
(52) U.S. Cl. .................................................. 455/456.2
(58) Field of Classification Search .................... 455/73, 455/422.1, 456.2, 552.1, 522, 7–8, 11.1, 455/15, 22, 456.1; 370/315, 328, 329, 507; 375/211; 725/127; 326/93
See application file for complete search history.

(56) References Cited

U.S. PATENT DOCUMENTS

| 7,593,688 | B2 * | 9/2009 | Pratt et al. | 455/7 |
| 2002/0155838 | A1 * | 10/2002 | Durrant et al. | 455/445 |
| 2005/0130588 | A1 * | 6/2005 | Pratt et al. | 455/11.1 |
| 2006/0195883 | A1 * | 8/2006 | Proctor et al. | 725/127 |
| 2007/0211786 | A1 * | 9/2007 | Shattil | 375/141 |
| 2008/0267266 | A1 * | 10/2008 | Kim et al. | 375/211 |

FOREIGN PATENT DOCUMENTS

| KR | 10-2004-0092610 A | 11/2004 |
| KR | 10-2005-0110654 A | 11/2005 |

* cited by examiner

*Primary Examiner* — Diane Mizrahi
(74) *Attorney, Agent, or Firm* — Jefferson IP Law, LLP

(57) ABSTRACT

An apparatus and method for location estimation in a wireless communication system are provided. The method includes identifying if a received at least one signal passed through at least one repeater, when the received at least one signal is identified as having passed though at least one repeater, measuring a Base Station (BS) basis delay time and calculating a repeater basis delay time using the measured BS basis delay time, and estimating a location of the MS using the repeater basis delay time.

27 Claims, 14 Drawing Sheets

APPARATUS AND METHOD FOR LOCATION ESTIMATION IN A WIRELESS COMMUNICATION SYSTEM

PRIORITY

This application claims the benefit under 35 U.S.C. §119 (a) of a Korean patent application filed in the Korean Intellectual Property Office on Sep. 3, 2007 and assigned Serial No. 2007-88986, the entire disclosure of which is hereby incorporated by reference.

BACKGROUND OF THE INVENTION

1. Field of the Invention

The present invention relates to an apparatus and method for estimating a location of a Mobile Station (MS) in a wireless communication system. More particularly, the present invention relates to an apparatus and method for reducing a location estimation error caused by a repeater.

2. Description of the Related Art

In order to support a higher transmission rate than a $3^{rd}$ Generation (3G) mobile communication system and extend service coverage, a new $4^{th}$ Generation (4G) mobile communication system is being developed. Many research institutes and enterprises of advanced countries are promoting the development of technology for future 4G-standardization.

A 4G mobile communication system operating in a high-frequency domain is limited in its service coverage because of a high path loss. In order to address this problem, a multi-hop signal forward scheme has been investigated. A multi-hop technology can reduce a path loss and make a high-speed data communication possible by relaying data using a relay, and can extend service coverage by forwarding a signal to a Mobile Station (MS), even if the MS is far away from a Base Station (BS).

As such, a multi-hop relay system requires one or more relays for relaying data between a transmitter and a receiver. In a cellular system, a relay can be a separate device distinguished from a BS and an MS. However, an MS can serve as a relay for a different MS. In the multi-hop relay system, a communication between two nodes is implemented through a transmitter-relay, relay-relay, relay-receiver radio link and the like.

Typically, a multi-hop relay technology can be divided into an amplify-and-forward scheme and a decode-and-forward scheme. The amplify-and-forward scheme is a scheme in which a relay amplifies a Radio Frequency (RF) signal received from a transmitter and relay-forwards the amplified signal to a receiver. The amplify-and-forward relay may be referred to in the alternative as a "repeater." The decode-and-forward scheme is a scheme in which a relay demodulates and decodes a received signal, again modulates and encodes the signal, and relay-forwards the signal to a receiver. The decode-and-forward relay may be referred to in the alternative as a "Relay Station (RS)." The description below is made describing an amplify-and-forward relay (i.e., a repeater) as an example.

Due to an increase of demand for a variety of services, a Location Based Service (LBS) has been developed in various forms. The LBS is, for example, a service of estimating a location of a user who is under emergency (i.e., disaster) circumstances, a service of estimating a location of a user (that is, an MS) and guiding the user to a restaurant and the like.

A Location Detection Technology (LDT) for the LBS has been widely known as a cell IDentifier (ID) technique, an Angle Of Arrival (AOA) technique, a Time Of Arrival (TOA) technique, a Time Difference Of Arrival (TDOA) technique, an Assisted-Global Positioning System (A-GPS) technique and the like. Among the LDT technologies, the A-GPS technique is the one mostly used due to it having the highest degree of accuracy. However, the A-GPS technique requires a minimum of four GPS satellites and thus, in a shadow area where less than four satellites are available, a hybrid GPS technology using TDOA or cell ID is used. That is, hybrid GPS can use either TDOA or cell ID according to requirements of a desired service or number of BSs that can be secured by a user and the like.

In a metropolitan area, many shadow areas can exist between a BS and an MS and thus, many repeaters may be used. When a TOA or TDOA technology is used for LBS, it requires a minimum of three BSs. However, when a signal from a BS is received by an MS through a repeater, a time delay of the received signal through the repeater is different then a time delay of the signal received directly from the BS. This difference in the time delay results in a location estimation error.

FIG. 1 illustrates that an MS receives signals from three BSs in a conventional wireless communication system.

When a signal from each BS is received via a real path through a repeater and not a desired path, a time delay occurs because of the repeater. Thus, an MS cannot calculate an accurate propagation delay (i.e., TDOA, TOA, etc.). That is, because the MS calculates TDOA considering a received signal as directly received from a BS, a location estimation error can occur.

In addition, when a signal from a BS is received by an MS through a plurality of repeaters, the MS cannot be aware if a signal is received through a repeater and thus it cannot accurately determined if the measured time delays correspond to a path though a repeater. Moreover, numerous repeaters are installed in a metropolitan area. These numerous repeaters deteriorate location estimation performance, which causes a problem when using a LDT.

SUMMARY OF THE INVENTION

An aspect of the present invention is to address at least the above problems and/or disadvantages and to provide at least the advantages described below. Accordingly, an aspect of the present invention is to provide an apparatus and method for estimating a location of a Mobile Station (MS) in a wireless communication system using a repeater.

Another aspect of the present invention is to provide an apparatus and method for reducing an error in estimating a location of an MS in a wireless communication system using a repeater.

A further aspect of the present invention is to provide an apparatus and method for distinguishing signals of repeaters in an MS of a wireless communication system using a repeater.

Still another aspect of the present invention is to provide an apparatus and method for reducing a Time Difference Of Arrival (TDOA) or Time Of Arrival (TOA) measurement error in a wireless communication system using a repeater.

Yet another aspect of the present invention is to provide an apparatus and method for calculating TDOA based on a repeater in a wireless communication system using a repeater.

The above aspects are addressed by providing an apparatus and method for location estimation in a wireless communication system.

According to one aspect of the present invention, a method of operating a Mobile Station (MS) in a wireless communication system is provided. The method includes identifying if a received at least one signal passed through at least one repeater, when the received at least one signal is identified as having passed though at least one repeater, measuring a Base Station (BS) basis delay time and calculating a repeater basis delay time using the measured BS basis delay time, and estimating a location of the MS using the repeater basis delay time.

When signals are simultaneously received from a BS and a repeater, the calculating may include measuring TDOA between the received two signals, and subtracting the measured TDOA value from a previously known delay value between the BS and the repeater to calculate a repeater basis TDOA.

When signals are simultaneously received from a BS and a repeater, the calculating may include measuring TOA for each of the received two signals, and subtracting a previously known delay value between the BS and the repeater from the measured TOA value for a repeater path to calculate a repeater basis TOA.

When a signal is received that was serially passed through a plurality of repeaters, the calculating may include measuring a delay between a BS and an MS, and subtracting a previously known delay value between a repeater closest to the MS and the BS from the measured delay value to calculate a closest-repeater basis TOA.

According to another aspect of the present invention, a Mobile Station (MS) apparatus in a wireless communication system is provided. The apparatus includes a receiver, a Fast Fourier Transform (FFT) processor, a repeater identification unit, and a calculator. The receiver converts a received at least one signal into sample data. The FFT processor processes the sample data by FFT and generates frequency-domain data. The repeater identification unit determines subcarrier values of a specific band among the frequency-domain data and identifies if there is at least one repeater pass signal. The calculator measures a Base Station (BS) basis delay time using the sample data and, when the repeater pass signal is identified, calculates at least one repeater basis delay time using the measured BS basis delay time.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness. Terms described below, which are defined considering functions in the exemplary embodiments of present invention, can be different depending on user and operator's intention or practice. Therefore, the terms should be defined on the basis of the disclosure throughout this specification.

A technology for accurately estimating a location of a Mobile Station (MS) in a wireless communication system using a repeater according to exemplary embodiments of the present invention is described below. More particularly, a scheme for reducing an estimation error caused by a repeater when a delay is calculated using Time Difference Of Arrival (TDOA), Time Of Arrival (TOA), Enhanced-Observed Time Difference (E-OTD) and the like according to exemplary embodiments of the present invention are described. The following description is made based on TDOA as an example. However, the present invention is equally applicable to any other Location Detection Technology (LDT).

An example of an Orthogonal Frequency Division Multiplexing (OFDM) based broadband wireless access communication system is described below as an example. However, the present invention is equally applicable to any wireless communication system using a repeater.

According to exemplary embodiments of the present invention, an MS should be able to distinguish if it receives a signal that has passed though one or more repeaters. Exemplary embodiments of the present invention use part of a band of an OFDM symbol for a repeater IDentifier (ID).

Figure 1:
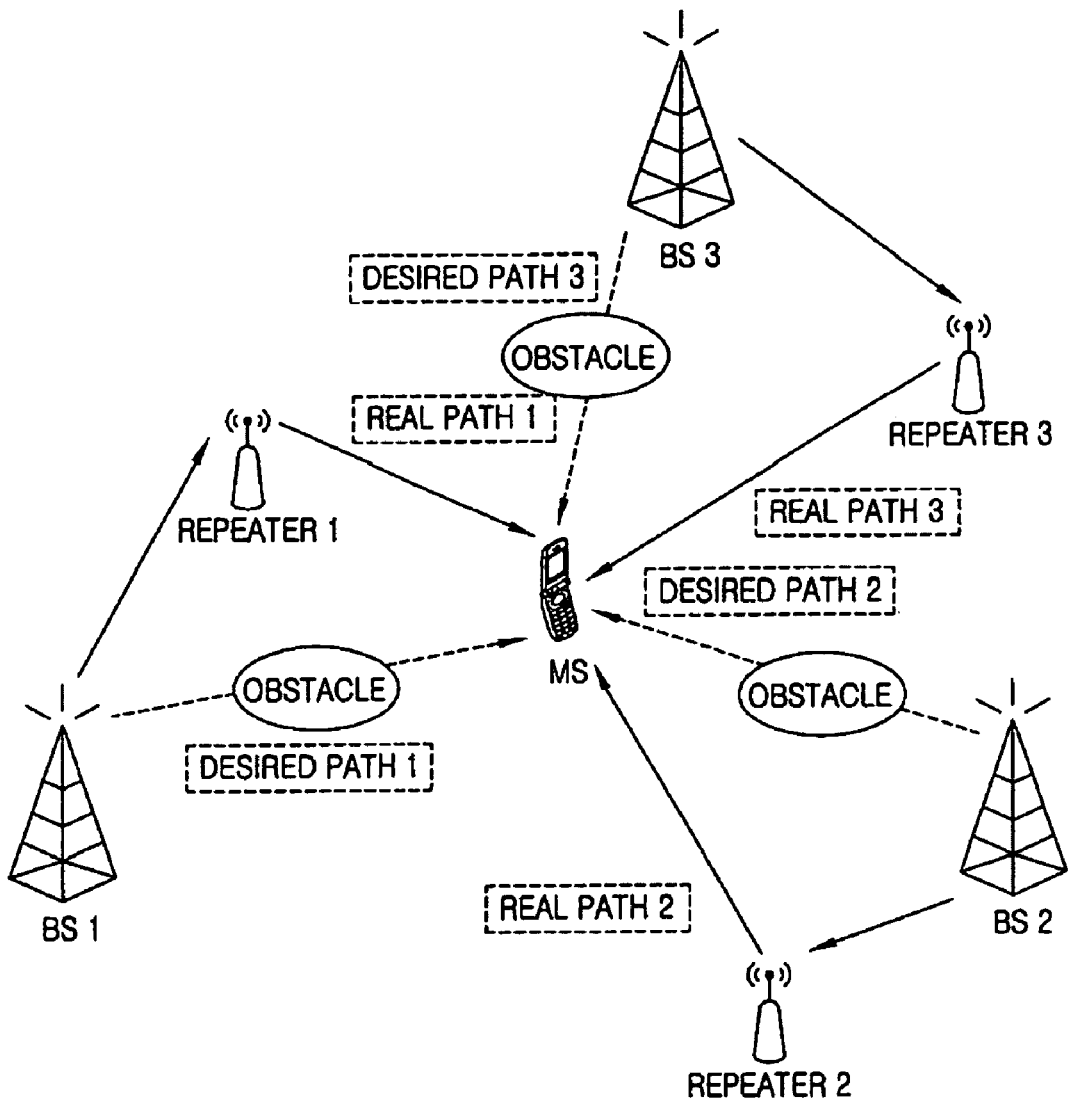
FIG. 1 is a diagram illustrating that a Mobile Station (MS) receives signals from three Base Stations (BSs) in a conventional wireless communication system.
Figure 2:
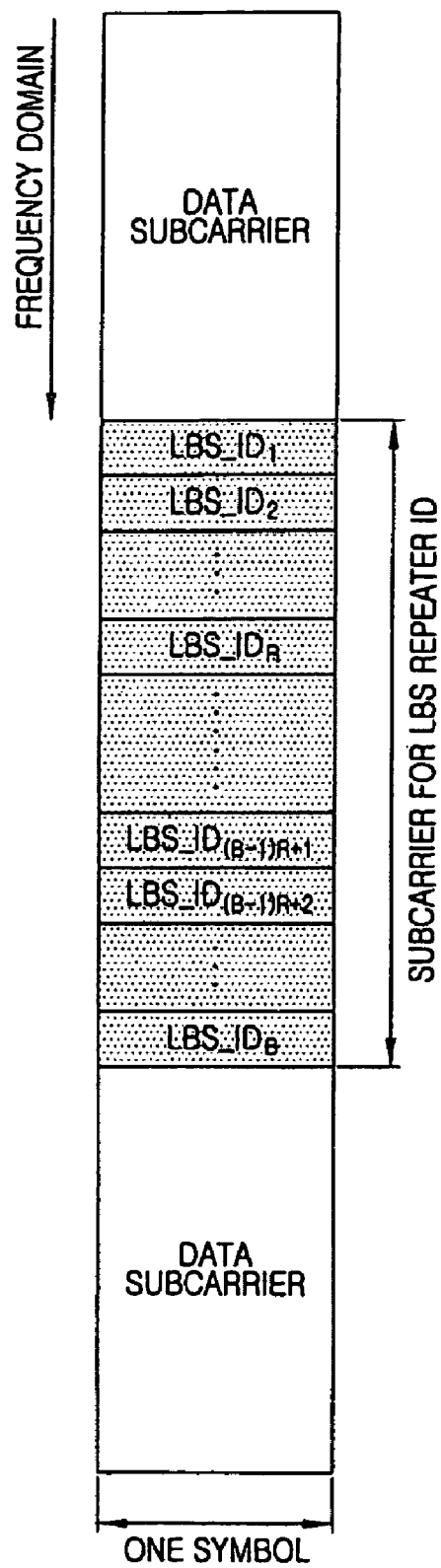
FIG. 2 is a diagram illustrating a structure of an Orthogonal Frequency Division Multiplexing (OFDM) symbol having a frequency band for a repeater IDentifier (ID) according to an exemplary embodiment of the present invention.

FIG. 2 is a diagram illustrating a structure of an OFDM symbol having a frequency band for a repeater ID according to an exemplary embodiment of the present invention. The frequency band can be either a data subcarrier band having data mapped or an unused guard subcarrier band.

As shown in FIG. 2, a position of each subcarrier within a specific frequency band serves as an identifier of a corresponding repeater. An MS identifies a position of a subcarrier having a data bit '1' mapped after Fast Fourier Transform (FFT) operation and recognizes a repeater pass signal depending on the position of the subcarrier having '1' mapped. That is, a repeater adds and transmits its own ID (that is, a repeater ID) when amplifying and forwarding a received signal from a BS (or an upper node). If there is a data bit '1' in a corresponding subcarrier, an MS recognizes that a signal has passed through a corresponding repeater. If there is no data bit '1', the MS recognizes that a signal has not passed through a repeater. Consequently, a position of a specific subcarrier serves as a ID of a repeater.

In FIG. 2, a signal passing through a repeater corresponding to an index 'I' has LBS_ID I=1, and a signal not passing through the repeater has LBS_ID I=0. The repeater index (or a repeater identifier) 'I' can be determined by Equation 1 below.

$$I=(b-1)R+r \tag{1}$$

In Equation 1, the 'b' (=1, ..., B) denotes an LBS ID allocated to a BS, the 'r' (=1, ..., R) denotes a number of a repeater belonging to the BS, the 'B' denotes the maximum value of the LBS ID that can be allocated to the BS, and the 'R' denotes the maximum number of repeaters that can be included in one cell. That is, a BS transmitting a signal and a repeater passing a signal can be judged from a position of a subcarrier with a data bit set as '1'.

Figure 3:
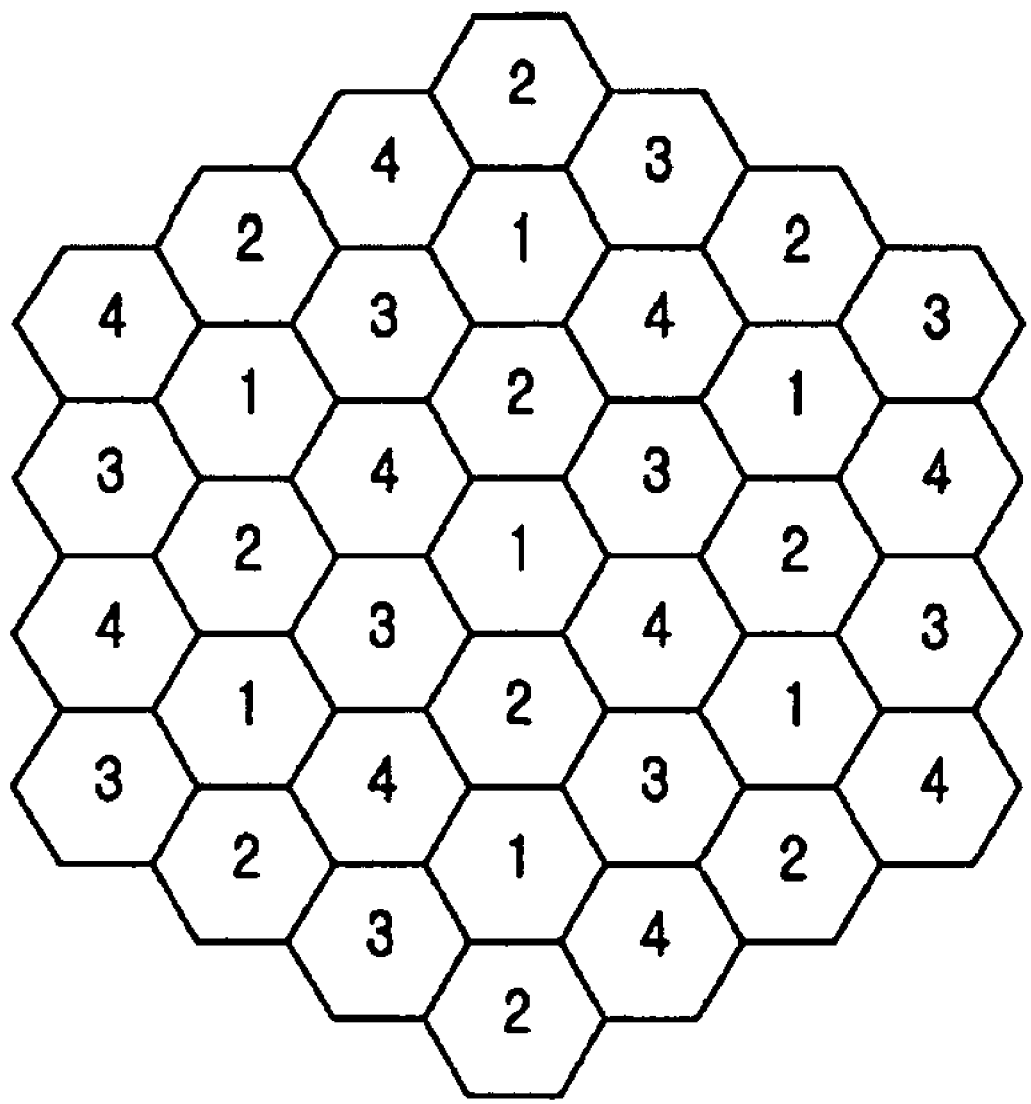
FIG. 3 is a diagram illustrating an example of cell planning for Location Based Service (LBS) ID allocation according to an exemplary embodiment of the present invention.

FIG. 3 is a diagram illustrating an example of cell planning for LBS ID allocation according to an exemplary embodiment of the present invention.

The assumption is that 'B' is equal to '4', neighboring BSs are allocated a different LBS ID, and a magnitude of a signal from a 2-tier BS is negligible. Because a specific frequency band is used for repeater identification, an overhead can increase as a repeater increases in number. In order to reduce this overhead, repeater identifiers can be allocated to subcarriers corresponding to a guard band and not a data band. In addition, a repeater can map its own identifier to all OFDM symbols consecutively or can map its own identifier at a preset period.

When a signal or signals are received from one or more repeaters, an MS calculates a propagation delay (i.e., TDOA) as follows.

The use of a TDOA technique can allow the use of a different delay estimation technique (e.g., a TOA technique). Thus, the following description is made aiming at the TDOA technique as an example. However, the present invention is equally applicable to any other LDT.

1. When Simultaneously Receiving Signals from a BS and a Repeater

Figure 4:
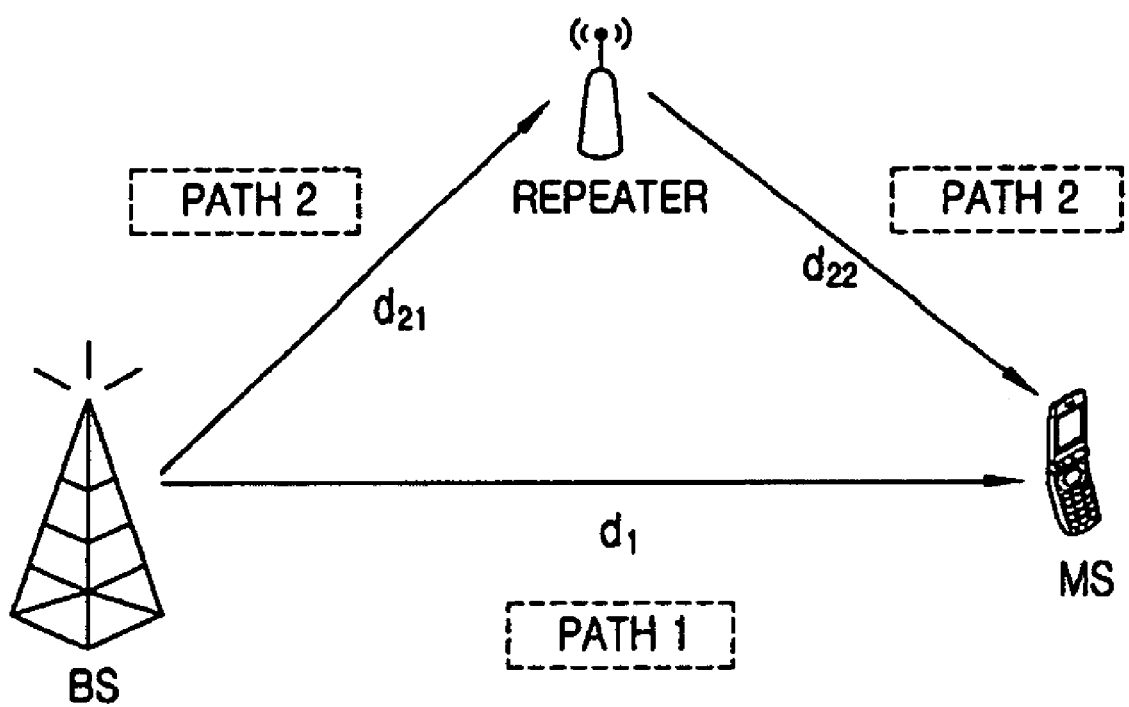
FIG. 4 is a diagram illustrating that an MS simultaneously receives signals from a BS and a repeater according to an exemplary embodiment of the present invention.

FIG. 4 is a diagram illustrating that an MS simultaneously receives signals from a BS and a repeater according to an exemplary embodiment of the present invention. In this case, one subcarrier among a band for a repeater identifier has a data bit '1' mapped and two path signals are detected.

In FIG. 4, a path 1 defines a path directly formed between a BS and an MS and a path 2 defines a path through a repeater. '$d_1$' defines a delay for the path 1, '$d_{21}$' defines a delay between the BS and the repeater, and '$d_{22}$' defines a delay between the repeater and the MS. TDOA ($\tau$) for the two signals received by the MS can be expressed as Equation 2 below.

$$\tau = d_{21} + d_{22} - d_1 \tag{2}$$

In Equation 2, $\tau$ cannot be used for location measurement because the two signals are based on the BS. Thus, so that the two signals received by the MS can have a different basis, Equation 2 can be modified and expressed as Equation 3 below.

$$\tau' = d_1 - d_{22} = d_{21} - \tau \tag{3}$$

In Equation 3, $\tau$ is a value measured from received signals. The '$d_{21}$' is a value known when a repeater is installed and can be received from a BS. That is, an MS receives a BS location, a repeater location, and a delay value ($d_{21}$) between a BS and a repeater from the BS and uses the same for location measurement. A processing delay of repeater is known from a specification of the repeater or is measurable. Thus, the delay between the BS and the repeater is assumed to include even the processing delay in an exemplary embodiment of the present invention.

Consequently, $\tau'$ can be obtained using the $\tau$ measured from the two received signals and the previously known '$d_{21}$'. In addition, if a signal from one other cell (or BS) is secured, two TDOAs ($\tau$) are secured, thus enabling location estimation for the MS. The location measurement for the MS requires signals from two different BSs. Thus, the location measurement is more easily performed as compared to when signals from three different BSs are required.

Figure 5:
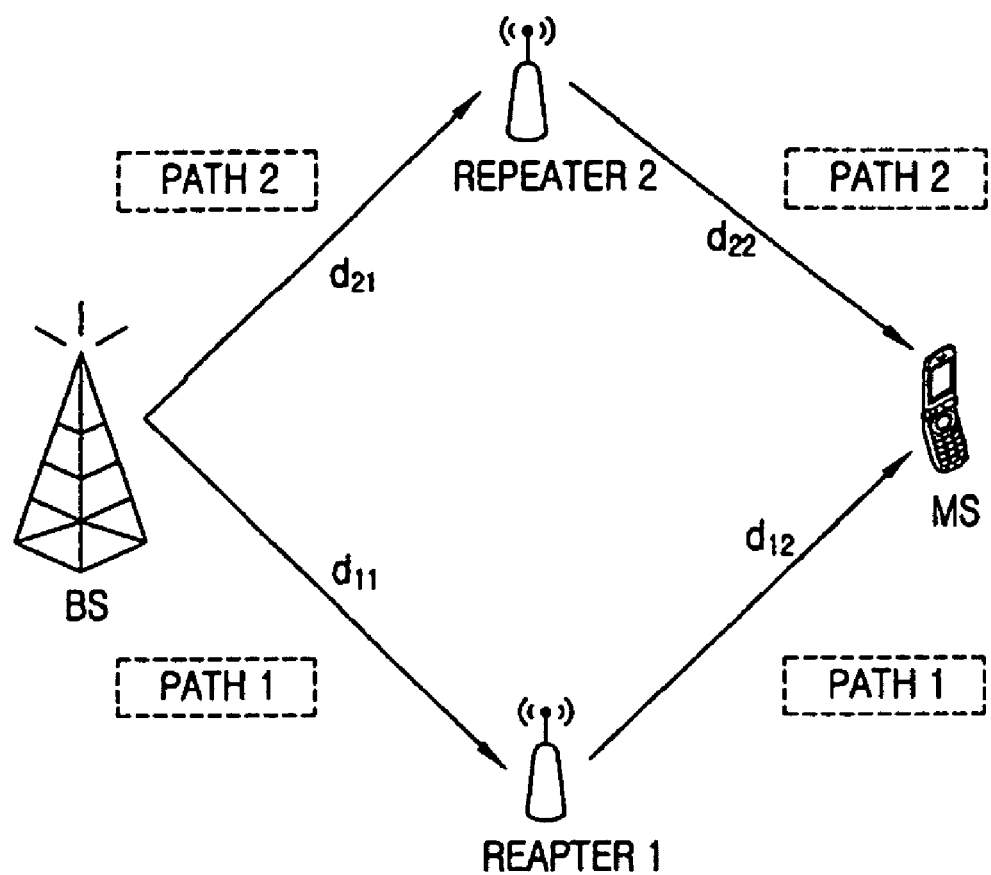
FIG. 5 is a diagram illustrating that an MS receives signals from one BS through two repeaters according to an exemplary embodiment of the present invention.

2. When Simultaneously Receiving Signals from a Plurality of Repeaters within One Cell FIG. 5 is a diagram illustrating that an MS receives signals from one BS through two repeaters according to an exemplary embodiment of the present invention. In this case, two subcarriers among a specific band for a repeater identifier have data bits '1' mapped and two path signals are detected.

In FIG. 5, a path 1 defines a path through a repeater 1 and a path 2 defines a path through a repeater 2. '$d_{11}$' defines a delay between a BS and the repeater 1, '$d_{12}$' defines a delay between the repeater 1 and an MS, '$d_{21}$' defines a delay between the BS and the repeater 2, and '$d_{22}$' defines a delay between the repeater 2 and the MS.

However, in FIG. 5, the MS can be aware that two detected signals are received through different repeaters, but cannot distinguish if each signal is received through any repeater. That is, in this case, it is impossible to perform location measurement using TDOA.

Figure 6:
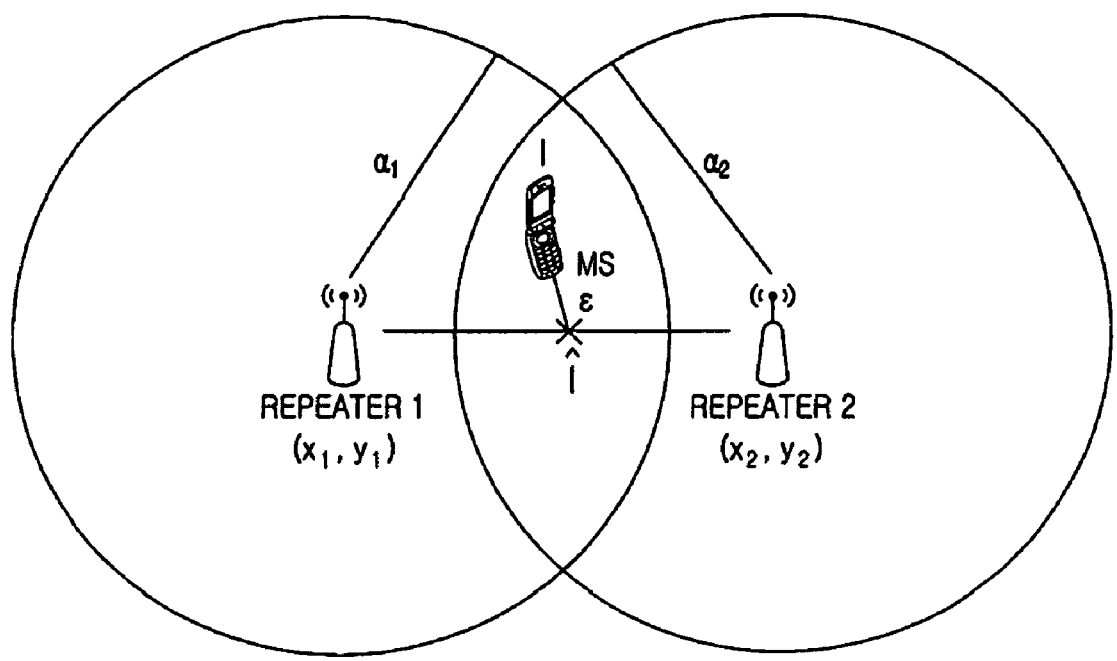
FIG. 6 is a diagram illustrating a method for location measurement according to an exemplary embodiment of the present invention.

FIG. 6 is a diagram illustrating a method for location measurement according to an exemplary embodiment of the present invention.

In metropolitan areas, it is common for there to be overlapping coverage areas of two or more repeaters. A repeater coverage area in the metropolitan area may be less than a maximum coverage area, such as several hundreds meters (m). Thus, a radius of a repeater overlapping coverage area is expected to be less than several hundreds meters. Therefore, in place of a TDOA calculation, a middle point of a two-repeater overlapping coverage area may be used to estimate a location of the MS. If used, the MS can have an error of less than 100 m to 500 m, which is similar to an error range when performing a location measurement using TDOA. That is, the location of the MS can be estimated as in Equation 4 below.

$$(x_l, y_l) \approx \left( \frac{(\alpha_2 x_1 + \alpha_1 x_2)}{\alpha_1 + \alpha_2}, \frac{(\alpha_2 y_1 + \alpha_1 y_2)}{\alpha_1 + \alpha_2} \right) \quad (4)$$

In Equation 4, the $(x_1, y_1)$ represents an estimated coordinate ($\hat{l}$) of the MS, and '$\alpha_1$' and '$\alpha_2$' represent coverage radiuses of the repeater 1 and repeater 2, respectively. Here, repeater coverage radius information can be received from the BS. In general, the repeaters 1 and 2 have a similar radius and thus, Equation 4 can be approximated by Equation 5 below.

$$(x_l, y_l) \approx \left( \frac{(x_1 + x_2)}{2}, \frac{(y_1 + y_2)}{2} \right) \quad (5)$$

When using Equation 5, a location estimation error ($\epsilon$) is given as in Equation 6 below.

$$\epsilon = |l - \hat{l}| \quad (6)$$

In Equation 6, l represents a real coordinate of the MS. The MS can receive coordinate information on the middle point of the two-repeater overlapping coverage area from the BS. Even when considering two or more repeaters, Equation 4 can be extended and used. As the number of repeaters increases, the location estimation error ($\epsilon$) decreases because an overlapping coverage area reduces.

3. When Receiving a Signal Serially Passing through a Plurality of Repeaters

Figure 7:
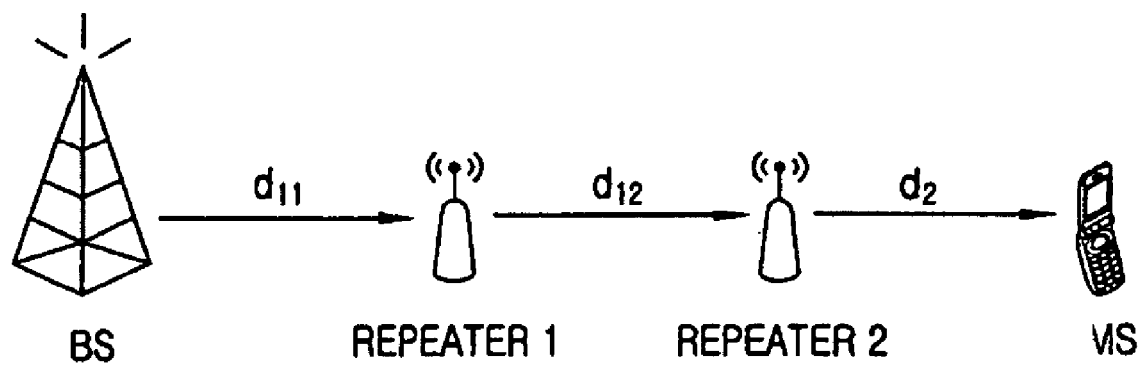
FIG. 7 is a diagram illustrating that an MS receives a signal that has serially passed through a plurality of repeaters from a BS according to an exemplary embodiment of the present invention.

FIG. 7 is a diagram illustrating that an MS receives a signal that has serially passed through a plurality of repeaters from a BS according to an exemplary embodiment of the present invention. This case happens more often when using an optical repeater rather than a Radio Frequency (RF) repeater. In this case, two subcarriers among a specific band for a repeater identifier have data bits '1' mapped and only one path signal is detected.

In FIG. 7, '$d_{11}$' defines a delay between a BS and a repeater 1, '$d_{12}$' defines a delay between the repeater 1 and a repeater 2, and '$d_2$' defines a delay between the repeater 2 and an MS. The MS is not aware of a sequence of the repeaters passing a signal. Thus, in consideration of a sequence of repeaters, an exemplary embodiment of the present invention is able to allocate a lower-index subcarrier to a repeater closer to the BS and allocate a higher-index subcarrier to a repeater farther away from the BS. That is, the MS can be aware of the sequence of the repeaters passing a signal from indexes of subcarriers having data bits '1' mapped. Also, the MS can acquire connection information on the repeaters serially connected from the BS together.

The MS can receive, from the BS, a location coordinate of the last repeater (i.e., the repeater 2) and the delays ($d_{11}$ and $d_{12}$) from the BS to the last repeater and thus, can calculate the delay ($d_2$) between the repeater 2 and the MS as in Equation 7 below.

$$d = d_{11} + d_{12} + d_2 = d_1 + d_2 \quad (7)$$

In Equation 7, 'd' represents the total delay value measured in the MS. If the MS can receive signals of two or more different cells, a location of the MS can be estimated using TDOA.

Constructions and operations of a BS, a repeater, and an MS according to an exemplary embodiment of the present invention are described below.

Figure 8:
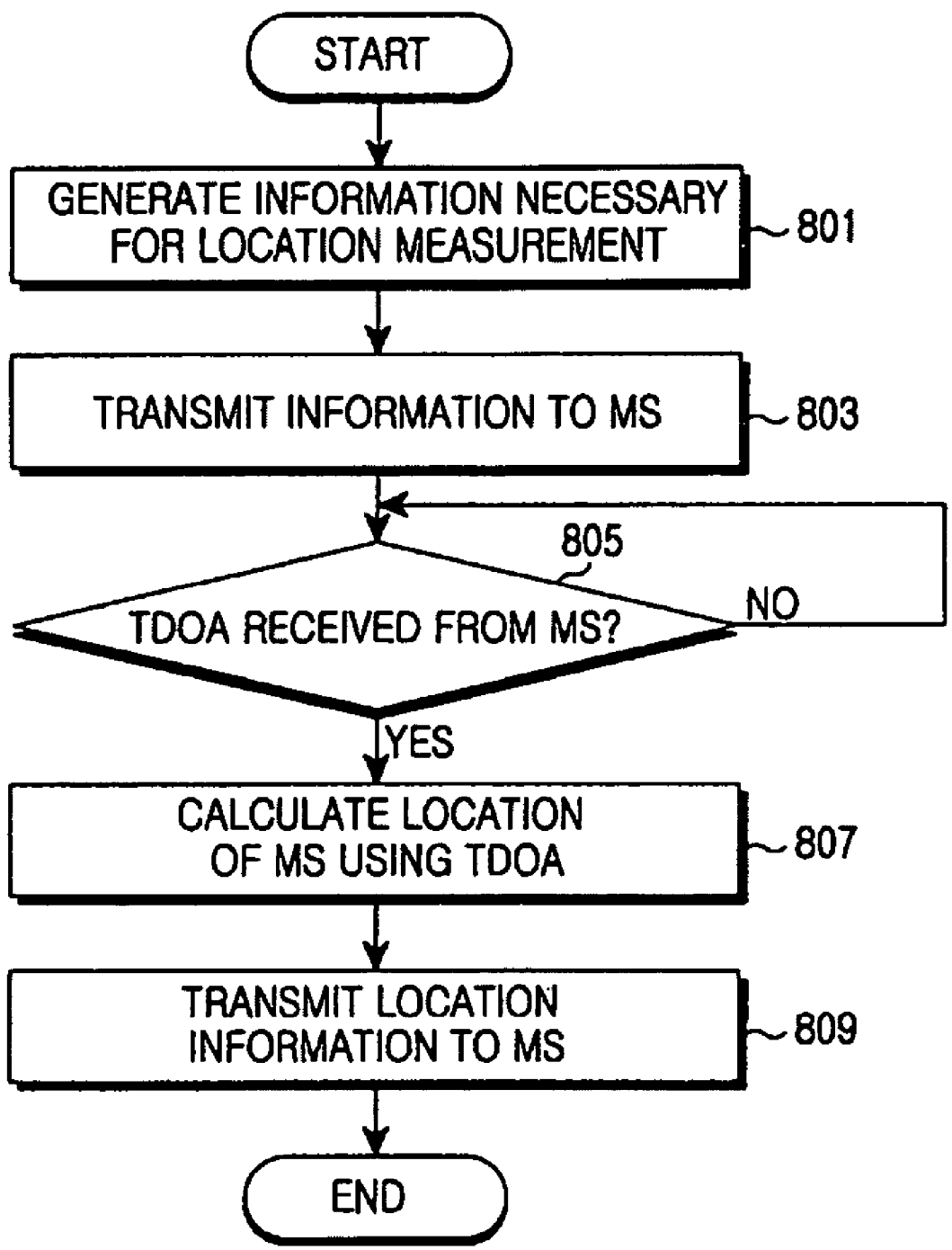
FIG. 8 is a flow diagram illustrating an operational process of a BS according to an exemplary embodiment of the present invention.

FIG. 8 is a flow diagram illustrating an operational process of a BS according to an exemplary embodiment of the present invention.

Referring to FIG. 8, in step 801, a BS generates information necessary for measuring a location of an MS. The information necessary for the location measurement can include location coordinates of neighboring BSs, location coordinates of neighboring repeaters, index information on a subcarrier allocated to each repeater, delay time information between a BS and each repeater and the like.

Then, in step 803, the BS transmits the information necessary for the location measurement to the MS. The information necessary for the location measurement can be transmitted using any one of broadcast, multicast, and unicast schemes. Alternatively, the information necessary for the location measurement can be transmitted to the MS according to a request of the MS or a judgment of the BS.

After transmitting the information necessary for the location measurement, in step 805, the BS determines if it receives a TDOA value from the MS. The assumption is that the BS receives at least one TDOA value from the MS. If an MS receives a signal through a repeater, the TDOA value is a value measured based on the repeater as described above with reference to FIGS. 4 to 7. When the BS receives a TDOA value from an MS, the BS calculates a location of the MS. If the MS directly calculates its own location, the BS can receive location information on the MS from the MS.

If receiving a TDOA value from an MS in step 805, the BS calculates a location of the MS using the TDOA value received from the MS in step 807. A method for calculating a location using TDOA is a technology for forming hyperbolic curves according to TDOA among three nodes (three coordinates) and for estimating a coordinate of a point where the hyperbolic curves overlapped as a location of an MS. This technology is conventional and thus, further description thereof is omitted. Location calculation requires a minimum of two TDOA values. Accordingly, if one TDOA value is received, the BS can calculate a location of an MS together using other schemes (e.g., a cell ID scheme and the like). In step 809, the BS transmits location information on the MS to the MS and then, terminates the process.

Figure 9:
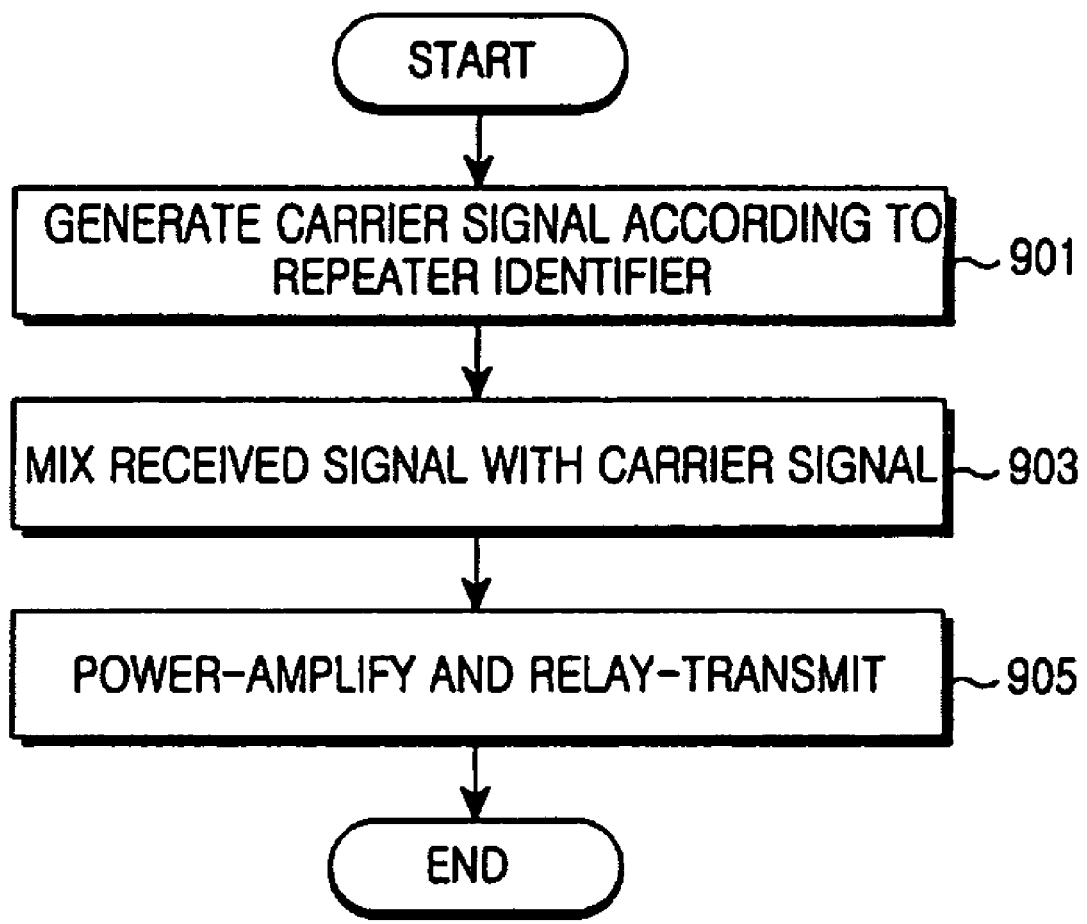
FIG. 9 is a flow diagram illustrating an operational process of a repeater according to an exemplary embodiment of the present invention.

FIG. 9 is a flow diagram illustrating an operational process of a repeater according to an exemplary embodiment of the present invention.

Referring to FIG. 9, in step 901, a repeater generates a carrier signal depending on its own identifier. That is, the repeater generates a carrier signal for mapping a data bit '1' to a position of a subcarrier allocated to the repeater. If a signal is received from a BS, the repeater mixes the received signal with the carrier signal in step 903. Then, in step 905, the repeater power-amplifies the mixed signal and relay-transmits the amplified signal to an MS.

As such, a repeater according to an exemplary embodiment of the present invention mixes a carrier signal corresponding to its own identifier with a received signal and relay-transmits the mixed signal. FIG. 9 assumes a downlink established from a BS to an MS. Identically, even in an uplink established from an MS to a BS, the repeater can mix a carrier signal according to a repeater identifier and relay-transmit the mixed signal to the BS. Thereby, the BS can identify if an uplink signal has been received through any repeater.

Figure 10:
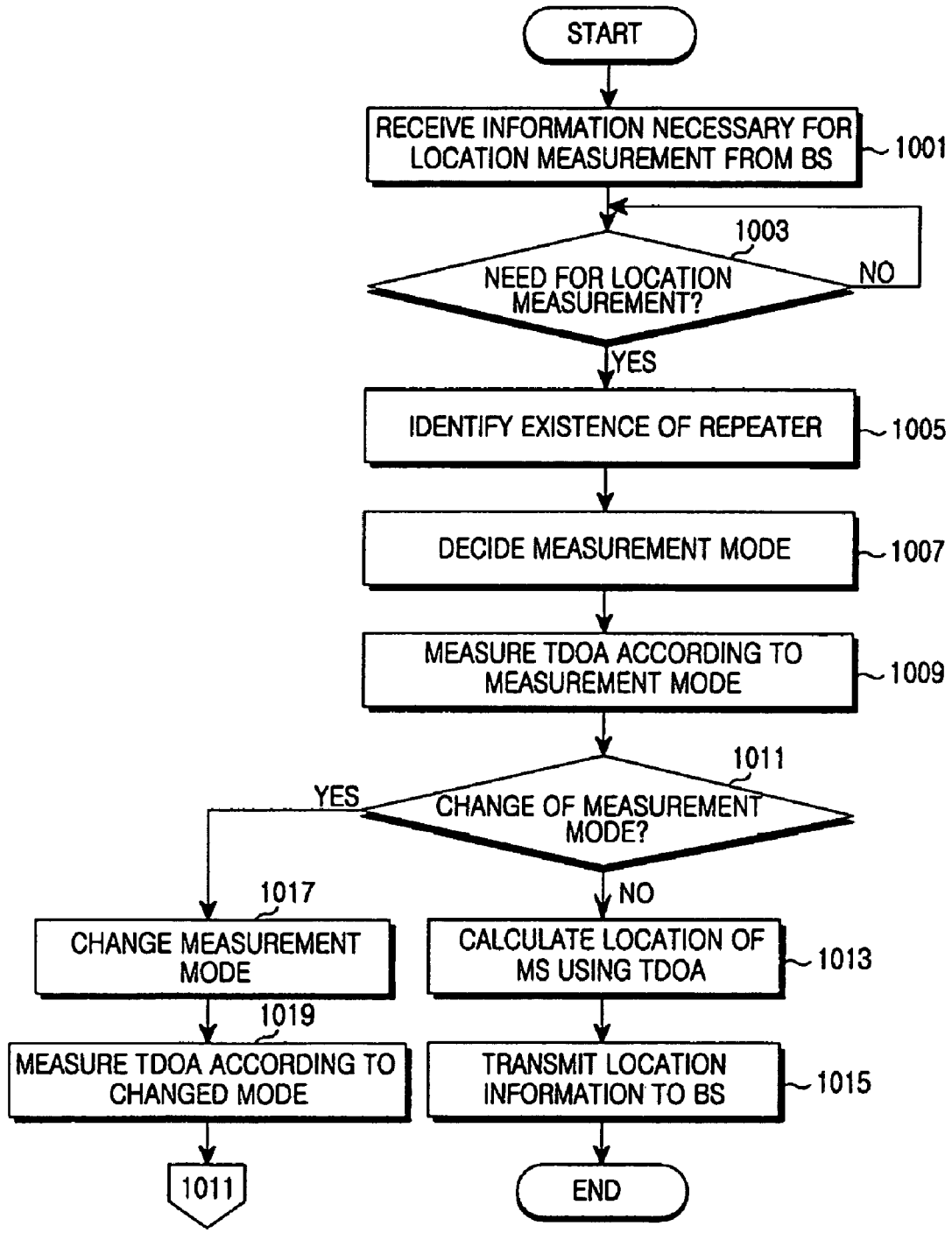
FIG. 10 is a flow diagram illustrating an operational process of an MS according to an exemplary embodiment of the present invention.

FIG. 10 is a flow diagram illustrating an operational process of a MS according to an exemplary embodiment of the present invention.

Referring to FIG. 10, in step 1001, an MS receives information necessary for location measurement from a BS. The information necessary for the location measurement can include location coordinates of neighboring BSs, location coordinates of neighboring repeaters, index information on a subcarrier allocated to each repeater, delay time information between a BS and each repeater and the like. The information necessary for the location measurement can be received using any one of broadcast, multicast, and unicast schemes and, alternatively, can be provided to the MS according to a request of the MS or a judgment of the BS.

In step 1003, the MS determines if there is a need for location measurement. The location measurement can be implemented according to a request of the BS or a judgment of the MS. If there is a need for location measurement, in step 1005, the MS determines subcarrier values of a specific band after FFT operation and identifies if there is a signal received from a repeater. That is, the MS identifies if there is a signal received via the repeater.

Then, in step 1007, the MS decides a measurement mode depending on the information necessary for the location measurement and the identified existence of the repeater. The measurement mode can be any one of the aforementioned schemes discussed above with reference to FIGS. 4 to 7. For example, a first measurement mode defines the scheme of FIG. 4, a second measurement mode defines the scheme of FIG. 5, a third measurement mode defines the scheme of FIG. 7, and a fourth measurement mode defines a TDOA measurement scheme based on a different BS. When an MS directly receives a signal from a BS and simultaneously, receives a signal from the BS through a repeater, the MS can measure TDOA in the first measurement mode.

In step 1009, the MS measures TDOA in the decided measurement mode. Here, TDOA between a plurality of path signals is measured using OFDM symbol synchronization, frame synchronization (or preamble synchronization) and the like and, when there is a signal from a repeater, the measured TDOA is converted into a repeater basis TDOA according to the measurement mode. At this time, the MS can acquire at least one TDOA value. In step 1011, the MS determines if there is a need for a change of the measurement mode. That is, the MS determines if it can measure TDOA in a different measurement mode. When there is a need for a change of the measurement mode, the MS changes the measurement mode in step 1017 and measures TDOA in the changed measurement mode in step 1019. Thereafter the process returns to step 1011.

When there is not a need for a change of the measurement mode in step 1011, the MS calculates its own location using the measured TDOA in step 1013. Here, the MS calculates the location using the minimum two TDOA values. When only one TDOA is measured, the MS can calculate the location using a cell ID technique and the like. In step 1015, the MS transmits its own location information to the BS. If the BS performs the location calculation, the MS can transmit the measured TDOA to the BS without calculating a location.

The MS can measure its own location periodically and can either transmit a calculated location to the BS after every measurement or transmit a current location in response to a request from the BS.

Figure 11:
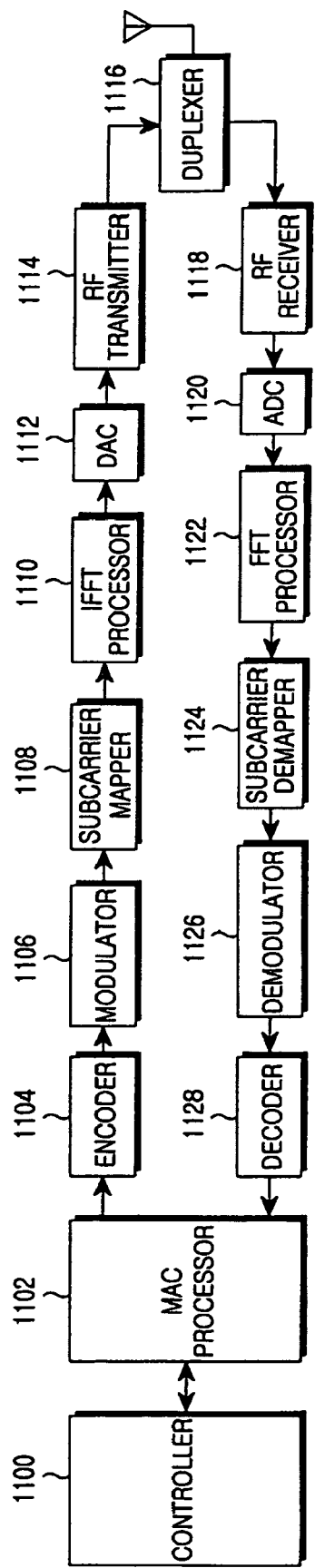
FIG. 11 is a block diagram illustrating a construction of a BS according to an exemplary embodiment of the present invention.

FIG. 11 is a block diagram illustrating a construction of a BS according to an exemplary embodiment of the present invention.

As shown in FIG. 11, a BS includes a controller 1100, a Media Access Control (MAC) processor 1102, an encoder 1104, a modulator 1106, a subcarrier mapper 1108, an Inverse Fast Fourier Transform (IFFT) processor 1110, a Digital to Analog Converter (DAC) 1112, a Radio Frequency (RF) transmitter 1114, a duplexer 1116, an RF receiver 1118, an Analog to Digital Converter (ADC) 1120, an FFT processor 1122, a subcarrier demapper 1124, a demodulator 1126, and a decoder 1128.

Referring to FIG. 11, the controller 1100 controls general operations of the BS in association with the MAC processor 1102. According to an exemplary embodiment of the present invention, the controller 1100 controls the MAC processor 1102 to transmit information necessary for measuring a location of an MS and calculates the location of the MS using TDOA information received from the MS. The information necessary for the location measurement can include location coordinates of neighboring BSs, location coordinates of neighboring repeaters, index information on a subcarrier allocated to each repeater, delay time information between a BS and each repeater and the like.

Under control of the controller 1100, the MAC processor 1102 generates a signaling message (i.e., a location measurement related signaling message) or analyzes a received signaling message. The MAC processor 1102 receives data from an upper layer (e.g., an Internet Protocol (IP) layer), constructs the received data as a data burst (i.e., a physical layer packet) to forward the data burst to the encoder 1104, and reassembles a data burst received from the decoder 1128 into a Service Data Unit (SDU) to forward the SDU to the upper layer.

The encoder 1104 encodes data from the MAC processor 1102. The encoder 1104 performs encoding in Convolutional Code (CC), Turbo Code (TC), Convolutional Turbo Code (CTC), Low Density Parity Check (LDPC) schemes and the like. The modulator 1106 modulates data from the encoder 1104. The modulator 1106 performs modulation by Quadrature Phase Shift Keying (QPSK), 16-Quadrature Amplitude Modulation (16-QAM), 32-QAM, 64-QAM and the like.

The subcarrier mapper 1108 maps data from the modulator 1106 to a subcarrier. The subcarrier mapper 1108 maps data to subcarriers excepting a specific band for a repeater identifier. The IFFT processor 1110 process data from the subcarrier mapper 1108 by IFFT operation and outputs sample data (an OFDM symbol). The DAC 1112 converts sample data from the IFFT processor 1110 into an analog signal. The RF transmitter 1114 converts a baseband signal from the DAC 1112 into an RF signal, and power-amplifies and provides the RF signal to the duplexer 1116.

The duplexer 1116 passes a signal for transmission from the RF transmitter 1114 through an antenna in a duplexing scheme and provides a received signal from the antenna to the RF receiver 1118. For example, in the case of a Time Division Duplex (TDD) scheme, the duplexer 1116 transmits a signal from the RF transmitter 1114 through the antenna in a transmission mode, and forwards a signal received through the antenna to the RF receiver 1118 in a reception mode.

The RF receiver 1118 converts an RF signal from the duplexer 1116 into a baseband signal. The ADC 1120 converts an analog signal from the RF receiver 1118 into baseband sample data. The FFT processor 1122 processes baseband sample data from the ADC 1120 by FFT operation and outputs frequency-domain data. The subcarrier demapper 1124 arranges frequency-domain data from the FFT processor 1122 in a burst unit.

The demodulator 1126 demodulates data from the subcarrier demapper 1124. The decoder 1128 decodes data from the demodulator 1126. The decoded data is processed into a signaling message in the MAC processor 1128 or traffic is reassembled into an SDU and forwarded to the upper layer.

Figure 12:
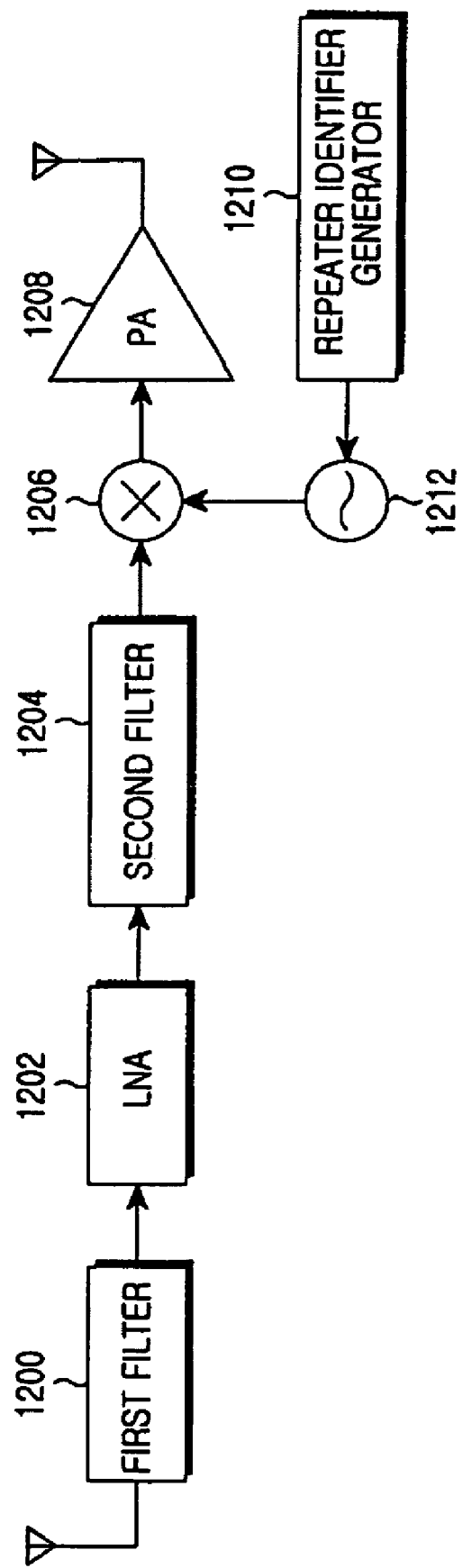
FIG. 12 is a block diagram illustrating a construction of a repeater according to an exemplary embodiment of the present invention.

FIG. 12 is a block diagram illustrating a construction of a repeater according to an exemplary embodiment of the present invention.

As shown in FIG. 12, a repeater includes a first filter 1200, a Low Noise Amplifier (LNA) 1202, a second filter 1204, a mixer 1206, a Power Amplifier (PA) 1208, a repeater identifier generator 1210, and a carrier generator 1212.

Referring to FIG. 12, the first filter 1200 filters only a desired frequency band signal among one or more signals received through an antenna. The first filter 1200 can operate as a duplexer. The LNA 1202 amplifies a signal from the first filter 1200 while suppressing noise. The second filter 1204 performs band pass filtering to prevent an image frequency from the amplified signal in the LNA 1202 from being forwarded to the mixer 1206.

The repeater identifier generator 1210 generates an identifier allocated to the repeater. The carrier generator 1212 generates a corresponding carrier signal according to a repeater identifier from the repeater identifier generator 1210. That is, the carrier generator 1212 generates a carrier signal for mapping a data bit '1' to a position of a subcarrier allocated to the repeater.

The mixer 1206 mixes the received signal from the second filter 1204 with the carrier signal from the carrier generator 1212. The PA 1208 power-amplifies the signal from the mixer 1206 and radiates the power-amplified signal through the antenna. As such, a repeater according to an exemplary embodiment of the present invention mixes a carrier signal corresponding to its own identifier with a received signal and relay-transmits the mixed signal.

Figure 13:
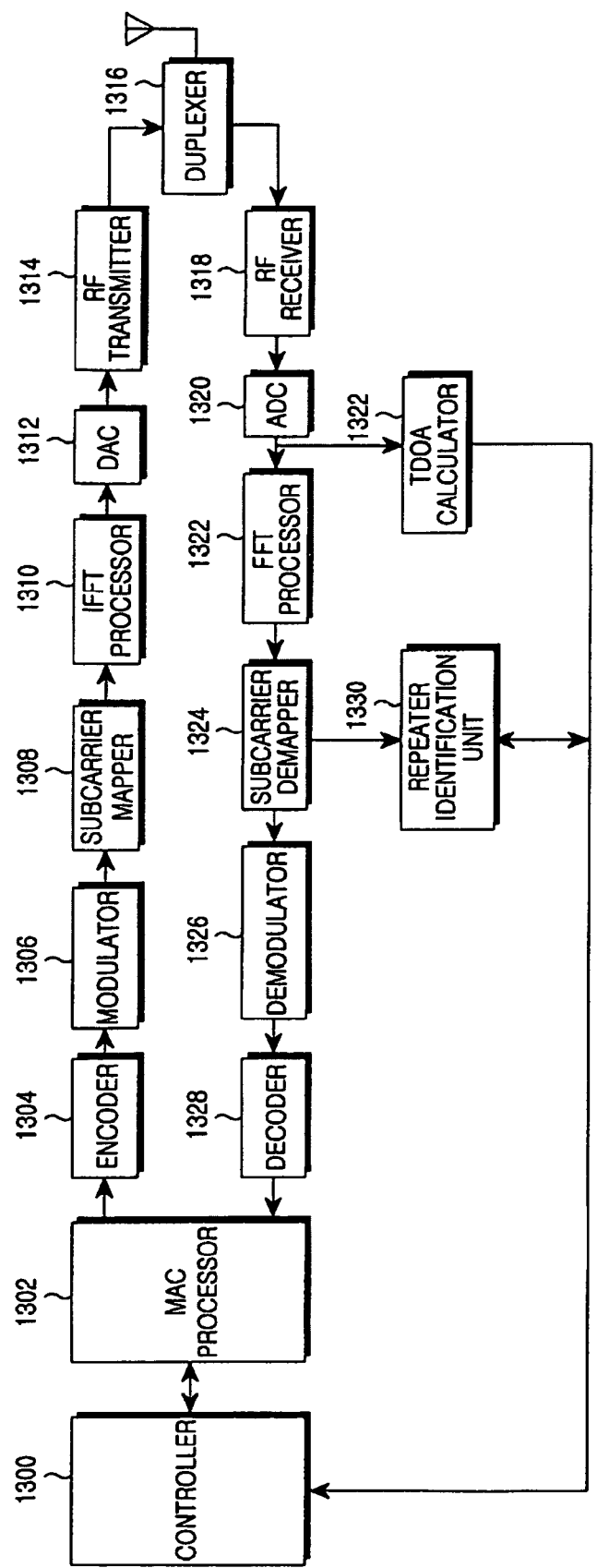
FIG. 13 is a block diagram illustrating a construction of an MS according to an exemplary embodiment of the present invention.

FIG. 13 is a block diagram illustrating a construction of an MS according to an exemplary embodiment of the present invention.

As shown in FIG. 13, an MS includes a controller 1300, a MAC processor 1302, an encoder 1304, a modulator 1306, a subcarrier mapper 1308, an IFFT processor 1310, a DAC 1312, an RF transmitter 1314, a duplexer 1316, an RF receiver 1318, an ADC 1320, an FFT processor 1322, a subcarrier demapper 1324, a demodulator 1326, a decoder 1328, a repeater identification unit 1330, and a TDOA calculator 1332.

A BS described in FIG. 11 and the MS use a similar communication module and thus, perform a similar transmission and reception operation. Accordingly, a description of the same or similar constructions as described for the BS is omitted and thus, a description is made aiming at a construction related to location measurement according to an exemplary embodiment of the present invention.

Referring to FIG. 13, the MAC processor 1302 analyzes a signaling message (or a MAC management message) received from a BS. The MAC processor 1302 extracts information necessary for measuring a location of the MS from the signaling message and provides the extracted information to the controller 1300. The information necessary for the location measurement can include location coordinates of neighboring BSs, location coordinates of neighboring repeaters, index information on a subcarrier allocated to each repeater, delay time information between a BS and each repeater and the like.

If determining that there is a need for location measurement, the controller 1300 enables the repeater identification unit 1330. That is, the subcarrier demapper 1324 extracts data of a specific band for a repeater identifier from frequency-domain data provided from the FFT processor 1322 and provides the extracted data to the repeater identification unit 1330. Then, the repeater identification unit 1330 determines data from the subcarrier demapper 1324, determines a location of a subcarrier having a data bit '1' mapped, and provides a repeater identifier (i.e., a subcarrier index) according to the subcarrier location to the controller 1300.

Then, the controller 1300 decides a measurement mode using a repeater identifier from the repeater identification unit 1330 and the information necessary for the location measurement received from a BS. The measurement mode can be any one of the aforementioned first to fourth measurement modes. For example, when a signal from a BS is received through one repeater, the controller 1300 can decide a TDOA measurement scheme as the first measurement mode. At this time, a plurality of measurement modes can also be used depending on the surroundings of an MS. If the measurement mode is decided, the controller 1300 controls the TDOA calculator 1332 according to the measurement mode.

Under control of the controller 1300, the TDOA calculator 1332 snapshots and stores sample data from the ADC 1320 during a preset interval, searches the stored sample data for OFDM symbol synchronization and frame synchronization, and measures TDOA between received signals. If TDOA is not measured, the TDOA calculator 1332 can increase a snapshot interval.

For example, assuming circumstances of FIG. 4, the TDOA calculator 1332 processes, by correlation, snapshot sample data using a Cyclic Prefix (CP) repeated at an OFDM symbol length and detects a peak of more than a reference value. That is, the TDOA calculator 1332 moves a sliding window for correlation by one sample while performing correlation. At this time, a plurality of peaks can be detected because of a multiple path. The TDOA calculator 1332 selects the two largest peaks among the peaks and measures TDOA using a number of samples between the selected two peaks. That is, the TDOA calculator 1332 measures TDOA between two signals considering one of the two peaks as a signal of a BS and considering the other peak as a signal of a repeater. Also, the TDOA between the two signals can exceed an OFDM symbol length. If so, the TDOA calculator 1332 can search frame synchronization of each signal and measure TDOA. The TDOA calculator 1332 calculates a repeater basis TDOA using the measured TDOA and a previously known delay between a BS and a repeater.

If measuring TDOA using signals from different BSs, the TDOA calculator 1332 can search frame synchronization of each BS and calculate TDOA. As such, the TDOA calculator 1332 calculates all available TDOAs and provides the calculated TDOAs to the controller 1330.

Then, the controller 1300 calculates the location of the MS using the TDOA. Here, the controller 1300 can calculate the location using the minimum two TDOA values. If only one TDOA is measured, the controller 1300 can calculate a location using a cell ID technique and the like together. The controller 1300 controls the MAC processor 1302 to transmit location information of the MS to a BS. If a BS performs final location calculation, the MS can transmit the calculated TDOA to the BS without calculating a location. The MS can measure its own location by periods and can either transmit a calculated location to the BS every measurement or transmit a current location according to a request of the BS.

A description of an example of an application of an exemplary embodiment of the present invention is described below.

Figure 14:
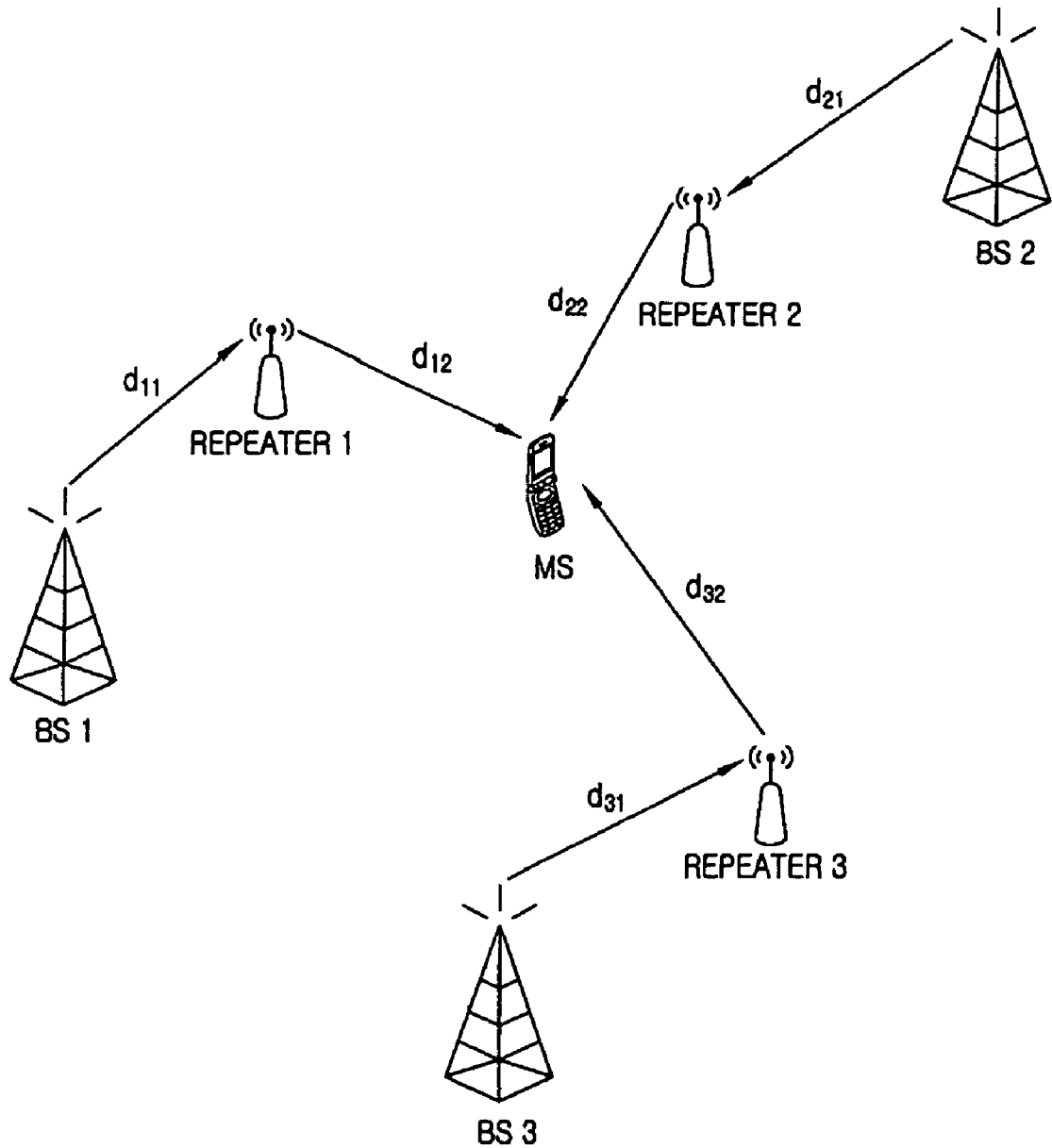
FIG. 14 is a diagram illustrating that signals from three BSs each are communicated to an MS via a different repeater according to an exemplary embodiment of the present invention.

FIG. 14 is a diagram illustrating that signals from three BSs each are communicated to an MS via a different repeater according to an exemplary embodiment of the present invention.

Referring to FIG. 14, the total of delays for respective signals reaching an MS from a BS1, a BS2, and a BS3 as expressed as Equation 8 below.

$$d_1 = d_{11} + d_{12}$$
$$d_2 = d_{21} + d_{22}$$
$$d_3 = d_{31} + d_{32} \tag{8}$$

In Equation 8, when assuming that the signal received by the MS from the BS1 has the shortest delay, TDOAs from detected received signals can be expressed as in Equation 9 below.

$$\tau_{2,1} = d_2 - d_1 = d_{21} + d_{22} - d_{11} - d_{12}$$
$$\tau_{3,1} = d_3 - d_1 = d_{31} + d_{32} - d_{11} - d_{12} \tag{9}$$

In Equation 9, $\tau_{2,1}$ represents TDOA between a signal received from BS 2 and a signal received from BS 1. $\tau_{3,1}$ represents TDOA between a signal received from BS 3 and a signal received from BS 1. However, $\tau_{2,1}$ and $\tau_{3,1}$ are BS basis values and thus, cannot be directly used for location measurement. So, a repeater basis TDOA value should be calculated as in Equation 10 below.

$$\tilde{\tau}_{2,1} = d_{22} - d_{12} = \tau_{2,1} - d_{21} + d_{11}$$
$$\tilde{\tau}_{3,1} = d_{32} - d_{12} = \tau_{3,1} - d_{31} + d_{11} \tag{10}$$

In Equation 10, $d_{21}$, $d_{11}$, and $d_{31}$ are values measured upon repeater installation and are previously known values, and $\tau_{2,1}$ and $\tau_{3,1}$ are values measured by the MS. Thus, $\tilde{\tau}_{2,1}$ and $\tilde{\tau}_{3,1}$ can be calculated. Consequently, an MS can calculate TDOAs on the basis of repeaters receiving signals and estimate a location of the MS using the TDOAs.

As described above, exemplary embodiments of the present invention have an advantage of being capable of estimating a location of an MS with minimal error even when a repeater is installed in a wireless communication system. That is, exemplary embodiments of the present invention can accurately estimate a location of an MS under any circumstance by providing a solution for all cases where a repeater can cause an error. In addition, exemplary embodiments of the present invention can provide an effect that an MS can recognize if a received signal goes through one or more repeaters.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of operating a Mobile Station (MS) in a wireless communication system, the method comprising:
   converting at least one received signal into sample data;
   processing the sample data by Fast Fourier Transform (FFT) and generating frequency-domain data;
   determining subcarrier values of a specific band among the frequency-domain data;
   identifying at least one received signal passed through at least one repeater using the determined subcarrier values;
   when the at least one received signal is identified as having passed through at least one repeater, measuring a Base Station (BS) basis delay time using the sample data and calculating a repeater basis delay time using the measured BS basis delay time; and
   estimating a location of the MS using the repeater basis delay time.

2. The method of claim 1, further comprising transmitting the estimated location of the MS to a BS.

3. The method of claim 1, wherein the delay time is at least one of Time Differential Of Arrival (TDOA), Time Of Arrival (TOA), and Enhanced-Observed Time Difference (E-OTD).

4. The method of claim 1, further comprising receiving information necessary for location measurement from a BS.

5. The method of claim 4, wherein the information necessary for the location measurement comprises at least one of location coordinates of neighboring BSs, location coordinates of neighboring repeaters, index information on a subcarrier allocated to each repeater, and delay time information between a BS and each repeater.

6. The method of claim 4, further comprising determining a measurement mode based on the information necessary for location measurement received from the BS.

7. The method of claim 6, further comprising determining whether the determined measurement mode should be changed after performing a measurement using the determined measurement mode.

8. The method of claim 1, wherein the at least one signal comprises signals simultaneously received from a BS and a repeater, further wherein the calculating of the repeater basis time comprises:
   measuring TDOA between the received two signals; and
   subtracting the measured TDOA value from a previously known delay value between the BS and the repeater to calculate a repeater basis TDOA.

9. The method of claim 1, wherein the at least one signal comprises signals simultaneously received from a BS and a repeater, further wherein the calculating of the repeater basis time comprises:
   measuring TOA for each of the received two signals; and
   subtracting a previously known delay value between the BS and the repeater from the measured TOA value for a repeater path to calculate a repeater basis TOA.

10. The method of claim 1, wherein the at least one signal comprises a signal serially passed through a plurality of repeaters, further wherein the calculating of the repeater basis time comprises:
    measuring a delay between a BS and an MS; and
    subtracting a previously known delay value between a repeater closest to the MS and the BS from the measured delay value to calculate a closest-repeater basis TOA.

11. The method of claim 1, wherein the at least one signal comprises signals from a BS that are simultaneously passed through a plurality of repeaters, further wherein the calculating of the repeater basis time comprises estimating a middle point of a service overlapping coverage areas of the plurality of repeaters as the location of the MS.

12. The method of claim 1, wherein the estimating of the location of the MS comprises estimating the location of the MS using at least two TDOAs or at least three TOAs.

13. The method of claim 1, wherein the identifying comprises:
    detecting a subcarrier having '1' mapped among subcarriers of a specific band; and
    determining that at least one signal of a repeater corresponding to an index of the subcarrier having '1' mapped is received.

14. A Mobile Station (MS) apparatus in a wireless communication system, the apparatus comprising:
    a receiver for converting at least one received signal into sample data;

a Fast Fourier Transform (FFT) processor for processing the sample data by FFT and for generating frequency-domain data;

a repeater identification unit for determining subcarrier values of a specific band among the frequency-domain data and for identifying at least one received signal passed through at least one repeater using the determined subcarrier values; and a calculator for measuring a Base Station (BS) basis delay time using the sample data and, when the at least one repeater pass signal is identified, for calculating a repeater basis delay time using the measured BS basis delay time.

15. The apparatus of claim 14, further comprising a controller for estimating a location of an MS using the repeater basis delay time.

16. The apparatus of claim 15, wherein the controller transmits the estimated location of the MS to a BS.

17. The apparatus of claim 15, wherein the controller receives information necessary for location measurement from a BS and stores the received information.

18. The apparatus of claim 17, wherein the information necessary for the location measurement comprises at least one of location coordinates of neighboring BSs, location coordinates of neighboring repeaters, index information on a subcarrier allocated to each repeater, and delay time information between a BS and each repeater.

19. The apparatus of claim 17, wherein the controller determines a measurement mode based on the information necessary for location measurement received from the BS.

20. The apparatus of claim 19, wherein the controller determines whether the determined measurement mode should be changed after performing a measurement using the determined measurement mode.

21. The apparatus of claim 15, wherein the controller estimates the location of the MS using at least two TDOAs or at least three TOAs.

22. The apparatus of claim 15, wherein the at least one signal comprises signals from a BS that are simultaneously received through a plurality of repeaters, further wherein the controller estimates a middle point of a service overlapping coverage areas of the plurality of repeaters as the location of the MS.

23. The apparatus of claim 14, wherein the delay time is at least one of Time Differential Of Arrival (TDOA), Time Of Arrival (TOA), and Enhanced-Observed Time Difference (E-OTD).

24. The apparatus of claim 14, wherein the at least one received signal comprises signals simultaneously received from a BS and a repeater, further wherein the calculator measures TDOA between the received two signals and subtracts the measured TDOA value from a previously known delay value between the BS and the repeater to calculate a repeater basis TDOA.

25. The apparatus of claim 14, wherein the at least one received signal comprises signals simultaneously received from a BS and a repeater, further wherein the calculator measures TOA for each of the received two signals and subtracts a previously known delay value between the BS and the repeater from the measured TOA value for a repeater path to calculate a repeater basis TOA.

26. The apparatus of claim 14, wherein the at least one signal comprises a signal serially passed through a plurality of repeaters, further wherein the calculator measures a delay between a BS and an MS and subtracts a previously known delay value between a repeater closest to the MS and the BS from the measured delay value to calculate a closest-repeater basis TOA.

27. The apparatus of claim 14, wherein the repeater identification unit detects a subcarrier having '1' mapped among the subcarriers of the specific band and determines that a signal of a repeater corresponding to an index of the subcarrier having '1' mapped is received.

* * * * *